United States Patent
Lin et al.

(10) Patent No.: US 10,914,882 B2
(45) Date of Patent: Feb. 9, 2021

(54) PROJECTION DEVICE, PROJECTION SYSTEM AND METHOD

(71) Applicant: DELTA ELECTRONICS, INC., Taoyuan (TW)

(72) Inventors: Yu-Nien Lin, Taoyuan (TW); Meng-Han Liu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 163 days.

(21) Appl. No.: 16/134,679

(22) Filed: Sep. 18, 2018

(65) Prior Publication Data

US 2019/0271804 A1    Sep. 5, 2019

(30) Foreign Application Priority Data

Mar. 1, 2018    (CN) .......................... 2018 1 0171482

(51) Int. Cl.
  *G02B 5/30*    (2006.01)
  *H04N 9/31*    (2006.01)

(52) U.S. Cl.
  CPC .......... *G02B 5/3083* (2013.01); *H04N 9/3161* (2013.01)

(58) Field of Classification Search
  CPC ....... H04N 9/3161; G02B 5/3083; G02B 5/30
  USPC .................................................... 359/494.01
  See application file for complete search history.

(56) References Cited

U.S. PATENT DOCUMENTS

| | | | | |
|---|---|---|---|---|
| 5,617,076 | A | * | 4/1997 | Stern ...................... B64D 15/20 340/583 |
| 5,838,239 | A | * | 11/1998 | Stern ...................... B64D 15/20 340/583 |
| 6,069,565 | A | * | 5/2000 | Stern ...................... B64D 15/20 340/583 |
| 7,789,515 | B2 | | 9/2010 | Hansen et al. |
| 7,796,339 | B2 | | 9/2010 | Fuse |
| 8,049,825 | B2 | | 11/2011 | Lescure et al. |
| 8,400,713 | B2 | | 3/2013 | Grasser |
| 8,964,294 | B2 | | 2/2015 | Grasser |
| 2004/0141234 | A1 | | 7/2004 | Sakaguchi |
| 2008/0049284 | A1 | | 2/2008 | Park et al. |
| 2008/0158512 | A1 | | 7/2008 | Mizushima et al. |
| 2008/0192205 | A1 | * | 8/2008 | De Vaan ............ G02F 1/13362 353/20 |
| 2009/0009687 | A1 | * | 1/2009 | Park ...................... G02B 5/0215 349/64 |
| 2009/0284713 | A1 | | 11/2009 | Silverstein et al. |

(Continued)

FOREIGN PATENT DOCUMENTS

| | | |
|---|---|---|
| CN | 104914654 A | 9/2015 |
| CN | 106707672 | 5/2017 |

(Continued)

*Primary Examiner* — William R Alexander
(74) *Attorney, Agent, or Firm* — Hauptman Ham, LLP

(57) ABSTRACT

A projection device includes a laser source and a birefringent depolarizer. The birefringent depolarizer is a single wedge shape and is arranged in front of a projection lens. The laser source is configured to emit a laser beam to penetrate the birefringent depolarizer to be a projection beam having multiple polarization patterns different from polarization patterns of the laser beam. The projection beam is projected onto a projection screen through the projection lens. The polarization patterns are multiple different polarization directions.

9 Claims, 8 Drawing Sheets

(56) References Cited

U.S. PATENT DOCUMENTS

| | | | | |
|---|---|---|---|---|
| 2013/0242365 A1* | 9/2013 | Koyanagi | ............. | G02B 27/48 |
| | | | | 359/207.9 |
| 2013/0271733 A1 | 10/2013 | Chiang | | |
| 2016/0054646 A1* | 2/2016 | Chang | ................... | G02B 6/262 |
| | | | | 353/31 |
| 2017/0104984 A1 | 4/2017 | Yamagishi et al. | | |

FOREIGN PATENT DOCUMENTS

| | | |
|---|---|---|
| TW | I237732 | 8/2005 |
| TW | 201001047 | 1/2010 |
| TW | 201341846 | 10/2013 |

* cited by examiner

US 10,914,882 B2

PROJECTION DEVICE, PROJECTION SYSTEM AND METHOD

RELATED APPLICATIONS

This application claims priority to China Application Serial Number 201810171482.5, filed Mar. 1, 2018, which is herein incorporated by reference.

BACKGROUND

Technical Field

The disclosure relates to a projection device, a projection system and a projection method, particularly to a projection device, a projection system and a projection method of depolarizing a laser source to improve color uniformity and image quality.

Description of Related Art

Light is an electromagnetic wave of which polarization has directionality. When an image is generated by a projector, if the polarization directions of light emitting from the projector are not evenly distributed at different positions of the screen, because the anisotropic material characteristics of the medium of the screen, the image presents a color block or a dark block on the screen.

SUMMARY

One aspect of the present disclosure is a projection device including a laser source and a birefringent depolarizer. The birefringent depolarizer is a single wedge shape and is arranged in front of a projection lens. The laser source is configured to emit a laser beam to penetrate the birefringent depolarizer to be a projection beam having a plurality of polarization patterns different from polarization patterns of the laser beam. The projection beam is projected onto a projection screen through the projection lens. The polarization patterns are multiple different polarization directions.

Another aspect of the present disclosure is a projection system. The projection system includes a laser source, a birefringent depolarizer and a projection lens. The birefringent depolarizer is a single wedge shape. The laser source is configured to emit a laser beam to penetrate the birefringent depolarizer to be a projection beam having a plurality of polarization patterns different from polarization patterns of the laser beam. The projection lens is arranged after the birefringent depolarizer and configured to output the projection beam.

Yet another aspect of the present disclosure is a projection method including emitting a laser beam by the laser source; forming a projection beam with multiple polarization patterns from the laser beam by penetrating the birefringent depolarizer, wherein the polarization patterns are multiple different polarization directions; and projecting the projection beam by a projection lens, wherein the birefringent depolarizer is a single wedge shape and is arranged in front of the projection lens.

DETAILED DESCRIPTION

The following embodiments are disclosed with accompanying diagrams for detailed description. For illustration clarity, many details of practice are explained in the following descriptions. However, it should be understood that these details of practice do not intend to limit the present disclosure. That is, these details of practice are not necessary in parts of embodiments of the present disclosure. Furthermore, for simplifying the diagrams, some of the conventional structures and elements are shown with schematic illustrations.

Figure 1:
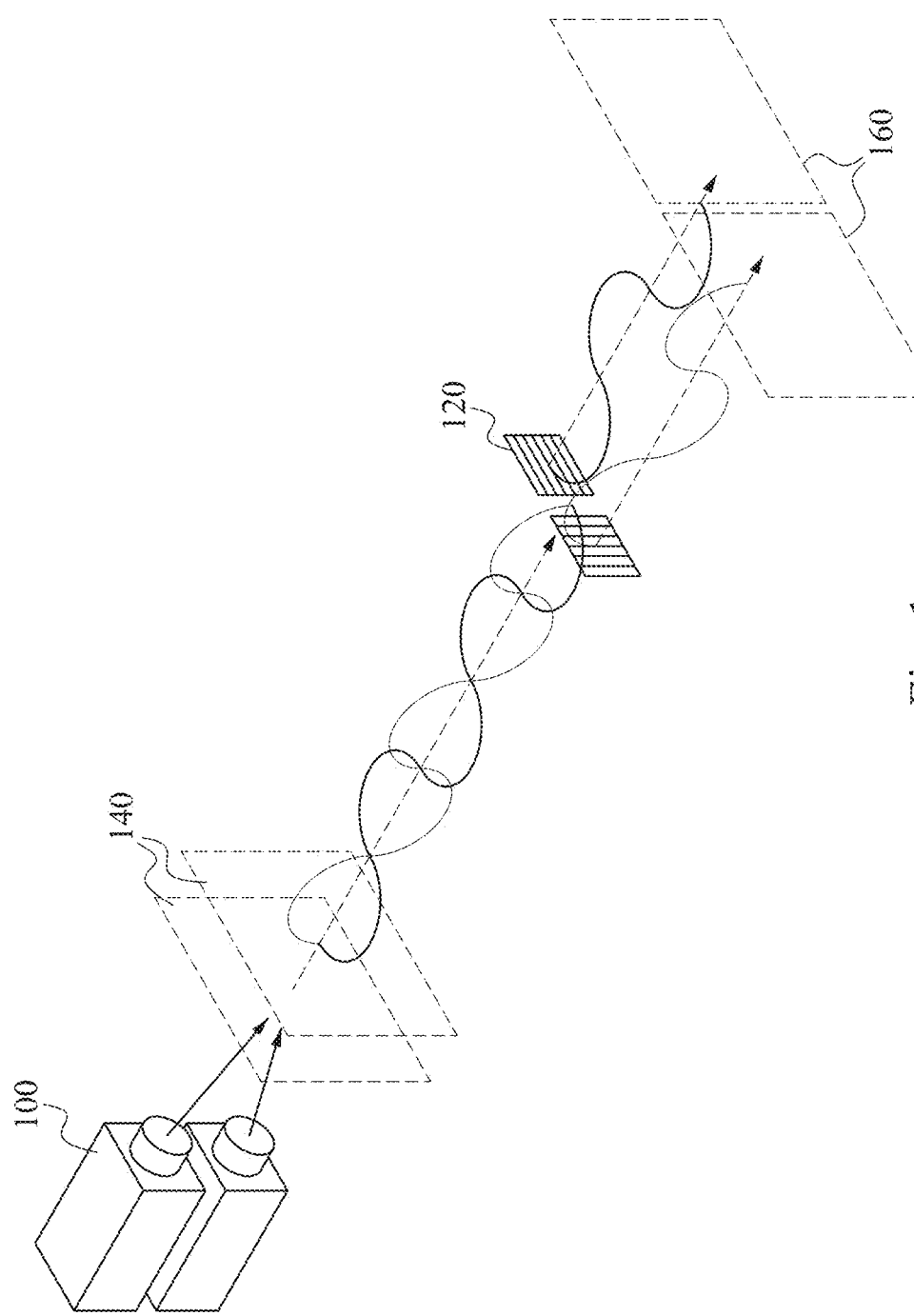
FIG. 1 is a schematic diagram illustrating a projection device in accordance with prior art.

Please refer to FIG. 1. FIG. 1 is a schematic diagram illustrating a 3D projector 100 in accordance with prior art. If the polarization direction of the light of image frames 140 including the left eye image and the right eye image projected by the 3D projector 100 is not evenly distributed, when the light penetrates the polarizer 120 and generates image frame 160 with two kinds of polarization directions perpendicular to each other, due to different transmission rates of the polarizer for light with different polarization directions, the color or brightness at different positions of the image frame 160 will be different.

Figure 2:
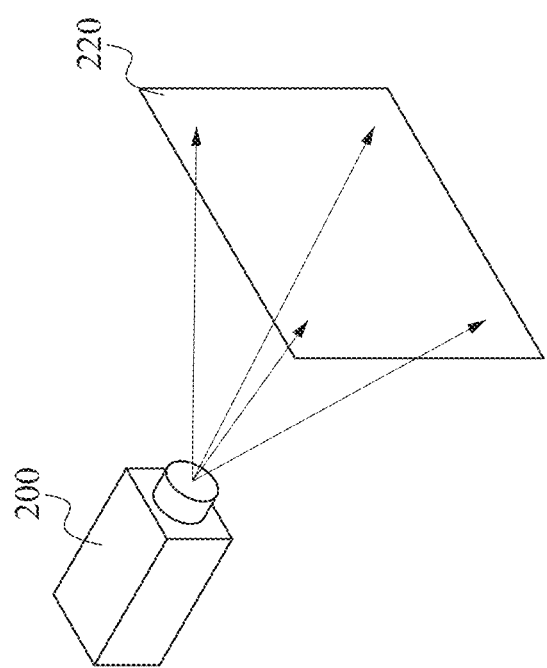
FIG. 2 is a schematic diagram illustrating another projection device in accordance with prior art.

Similarly, please refer to FIG. 2. FIG. 2 is a schematic diagram illustrating a rear projection projector 200 in accordance with prior art. Since stresses at different positions of the material of the screen 220 are remained differently during the manufacture process, the structure of the screen is slightly different. If the polarization directions of the light outputted to the different positions of the screen 220 by the projector 200 are not evenly distributed, due to the different absorption rates of light with different polarization directions at the different positions of the screen 220, the color or brightness at different positions of the image frame will be different.

In other words, if the polarization directions of the light projected at different positions of the screen are not evenly distributed, after the light reflects from or transmits through the medium (e.g., screen), due to the anisotropic material characteristics of the medium, i.e. the refractive index, reflectivity or absorption rate being variant with different light polarization directions, different colors or brightness will appear at the different positions of the screen. Accordingly, a projection device, a projection system and a projection method are provided in some embodiments of the present disclosure that may be applied to various projection equipment, such as a 3D projector, a rear projection projector, etc., so that the polarization directions of the light may be evenly distributed.

Figure 3A:
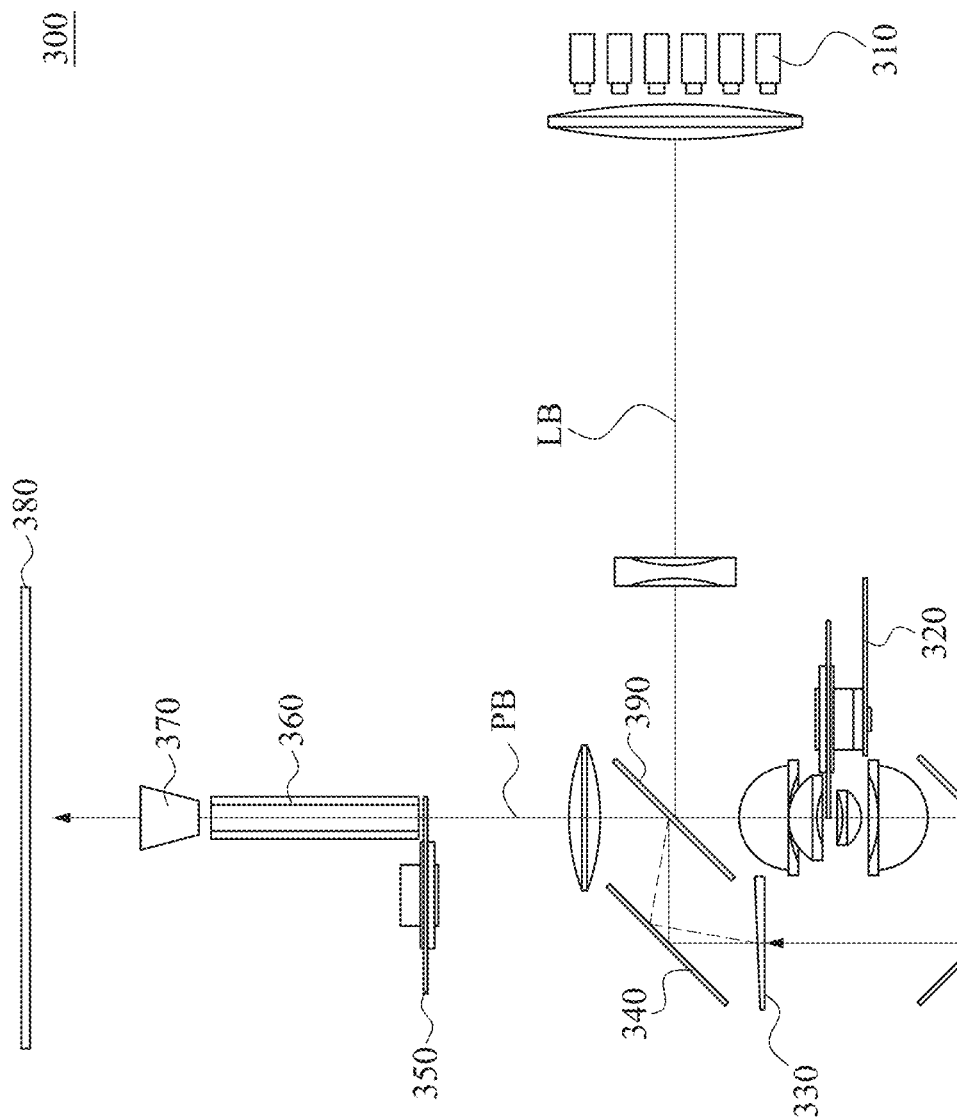
FIG. 3A and 3B are schematic diagrams illustrating of a projection system in accordance with some embodiments of the disclosure.

Please refer to FIG. 3A. FIG. 3A is a schematic diagram illustrating of a projection system 300 in accordance with some embodiments of the disclosure. In some embodiments, the projection system 300 includes a laser source 310, a birefringent depolarizer 330 and a projection lens 370. In some other embodiments, the projection system 300 further includes a phosphor wheel 320, a compensation unit 340, a color wheel 350, an integration rod 360 and/or a projection screen 380. The laser source 310, the phosphor wheel 320, the birefringent depolarizer 330, the compensation unit 340, the dichroic mirror 390, the color wheel 350, the integration rod 360 and projection lens 370 are arranged to suitable positions in the projection equipment respectively, so that the projection equipment projects the outputted image to the projection screen 380. As shown in FIG. 3A, the birefringent depolarizer 330 may be arranged in front of the integration rod 360 and the projection lens 370. In other words, the laser beam LB emitted from the laser source 310 will pass through the birefringent depolarizer 330 first, then pass through the integration rod 360 and the projection lens 370. In some other embodiments, the birefringent depolarizer 330 may be arranged between the integration rod 360 and the projection lens 370. That is, the laser beam LB emitted from the laser source 310 will first pass through the integration rod 360, then pass through the birefringent depolarizer 330, and finally pass through the projection lens 370.

Figure 3B:
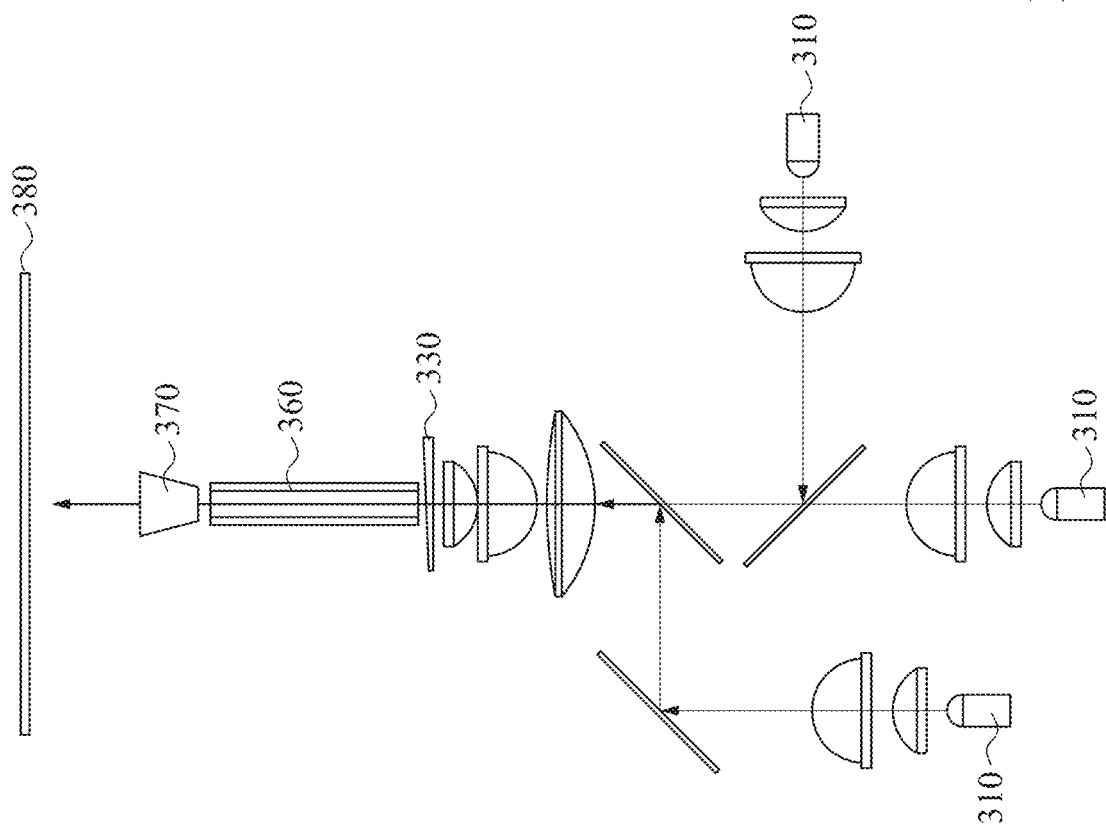

In some embodiments, the laser source 310 includes multiple sub laser sources configured to generate multiple sub laser beams respectively. For example, as shown in FIG. 3B, the laser source 310 may include a blue laser source, a red laser source and a green laser source. The blue sub laser source generates the blue sub laser beam, the red sub laser source generates the red sub laser beam, and the green sub laser source generates the green sub laser beam. In this case, the phosphor wheel and color wheel may not be necessary, but diffuser wheel may be used to solve speckle problem.

Referring back to FIG. 3A, the laser source 310 is configured to emit a blue laser beam LB. The blue laser beam emitted by the blue laser source enters the phosphor wheel 320 via a dichroic mirror 390 reflection, and generates a red beam and a green beam by exciting the phosphor powders of the phosphor wheel 320. The excited red beam and green beam then are reflected by a reflective layer of the phosphor wheel and pass through the dichroic mirror 390. The phosphor wheel 320 also has a transparent section to let the blue laser beam pass through. In the alternative, the blue laser beam LB can excite yellow phosphor powders disposed on the phosphor wheel 320 to generate a yellow beam which encompass wider wavelength at least covering partial red wavelength and green wavelength. Likewise, the excited yellow beam then is reflected by a reflective layer of the phosphor wheel and passes through the dichroic mirror 390, and the blue laser beam passes through a transparent section of the phosphor wheel 320.

Please refer to FIG. 3A and 3B, the blue laser beam LB or multiple laser beams (e.g. blue laser beam, red laser beam and green laser beam in some other embodiments) then enter the birefringent depolarizer 330 via appropriate lens convergence and/or mirror reflection. The birefringent depolarizer 330 includes birefringent optical material configured to form a projection beam PB including multiple polarization patterns after the laser beam LB penetrates the birefringent depolarizer 330, in which the polarization patterns are multiple different polarization directions. For the convenience and clarity of explanation, the specific discussion of the birefringent depolarizer 330 will be described in the following paragraphs.

In some embodiments, the compensation unit 340 may be a refraction or reflection compensation unit assigned after the birefringent depolarizer 330 on the light path. As shown in FIG. 3A, by the compensation unit 340, the deviation of light path of the projection beam PB resulting from penetrating the birefringent depolarizer 330 is compensated. The compensation unit 340 may be realized by a plane mirror, reflection prism, etc. Accordingly, the compensation unit 340 is configured to adjust the light path of the projection beam PB. In some other embodiments, other units in the projection system 300 may also be designed to match the deviation of light traveling direction due to penetrating the birefringent depolarizer 330.

Next, the projection beam enters the color wheel 350, and then enters the integration rod 360. In this embodiment, the integration rod 360 is arranged after the birefringent depolarizer 330, and configured to uniform the brightness of the projection beam PB. In some other embodiments, the birefringent depolarizer 330 can arranged at the exit of the integration rod 360. Afterwards, the projection beam PB enters the projection lens 370 configured to project the projection beam PB to the projection screen 380. The projection screen 380 is arranged after the projection lens 370 and configured to reflect or transmit the projection beam PB to form the projection image. The projection screen 380 may be an anisotropic material made of polymers having different absorption rates for light with different polarization directions.

The projection beam PB depolarized by the birefringent depolarizer 330 includes polarization patterns with multiple different polarization directions, so the polarization directions of the light projected to the different positions of the projection screen 380 are evenly distributed. In this way, even the projection screen 380 has different absorption rates for light with different polarization directions, there will not be color or brightness difference over different positions of the projection image on the projection screen 380.

Figure 4:
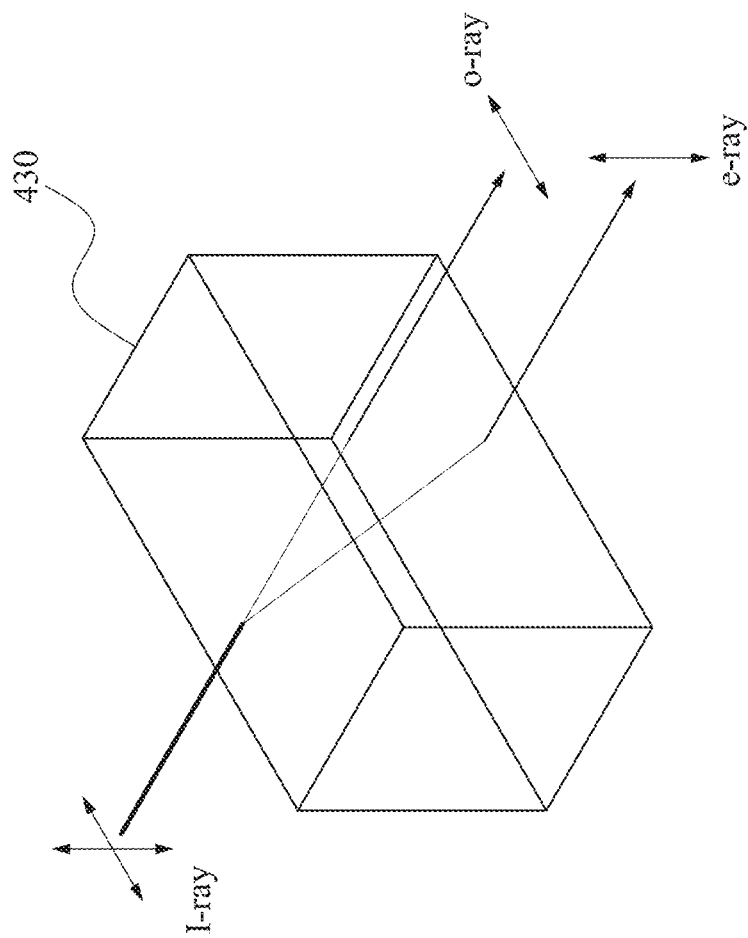
FIG. 4 is a schematic diagram illustrating of a birefringent optical material in accordance with some embodiments of the disclosure.

To further illustrate the optical properties of birefringent optical materials, please refer to FIG. 4. FIG. 4 is a schematic diagram illustrating a birefringent optical material in accordance with some embodiments of the disclosure. In the embodiments shown in FIG. 4, the optical lens 430 is made of birefringent optical material. The birefringent optical material has two refractive indexes for incident light. As shown in the figure, when the incident light I-ray with any polarization directions enters the optical lens 430, the light will split into a first transmitted light o-ray and a second transmitted light e-ray with different polarization directions respectively. The polarization direction of the first transmitted light o-ray and the polarization direction of the second transmitted light e-ray are vertical to each other. According to the optical property of the birefringent optical material, when the incident light I-ray enters the optical lens 430 with a specific angle, the incident light I-ray will not be split into two refraction lights with different polarization directions. The incident axis with the specific angle is called the crystal axis of the optical lens 430.

Figure 5A:
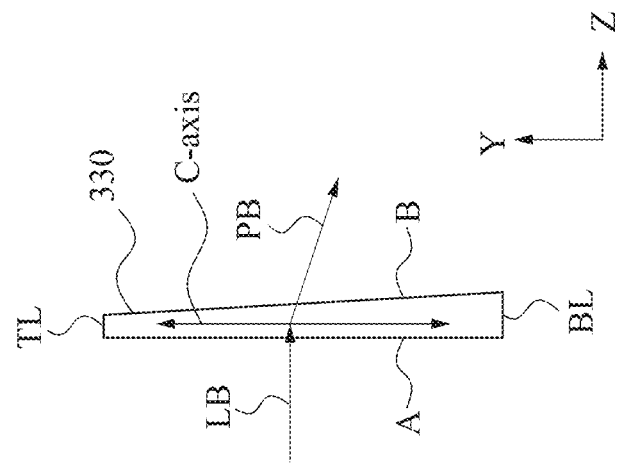
FIG. 5A and 5B are schematic diagrams illustrating of a birefringent depolarizer in accordance with some embodiments of the disclosure.
Figure 5B:
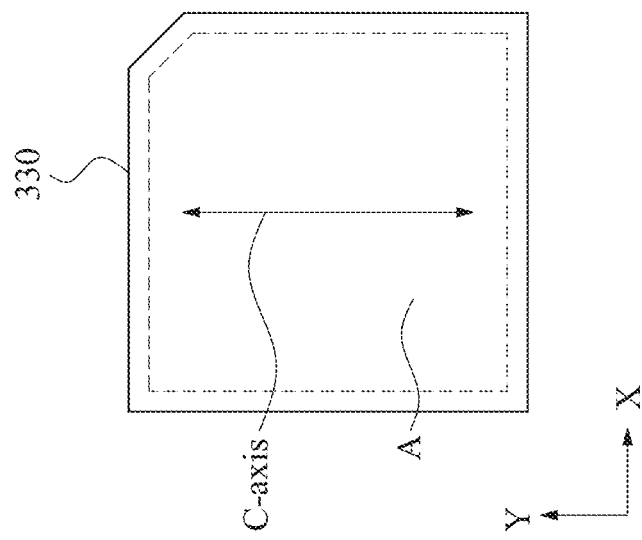

Next, please refer to FIG. 5A and FIG. 5B. FIG. 5A and FIG. 5B are front and side schematic diagrams illustrating a birefringent depolarizer 330 in accordance with some embodiments of the disclosure. As shown in the figures, in some embodiments, the birefringent depolarizer 330 is a wedge shape with narrow upper and wide bottom, including a first transmitted plane A and a second transmitted plane B. In some embodiments, the thickness of the narrow upper TL may be about 2.2 mm, and the thickness of the wide bottom BL may be about 3.25 mm.

Figure 6:
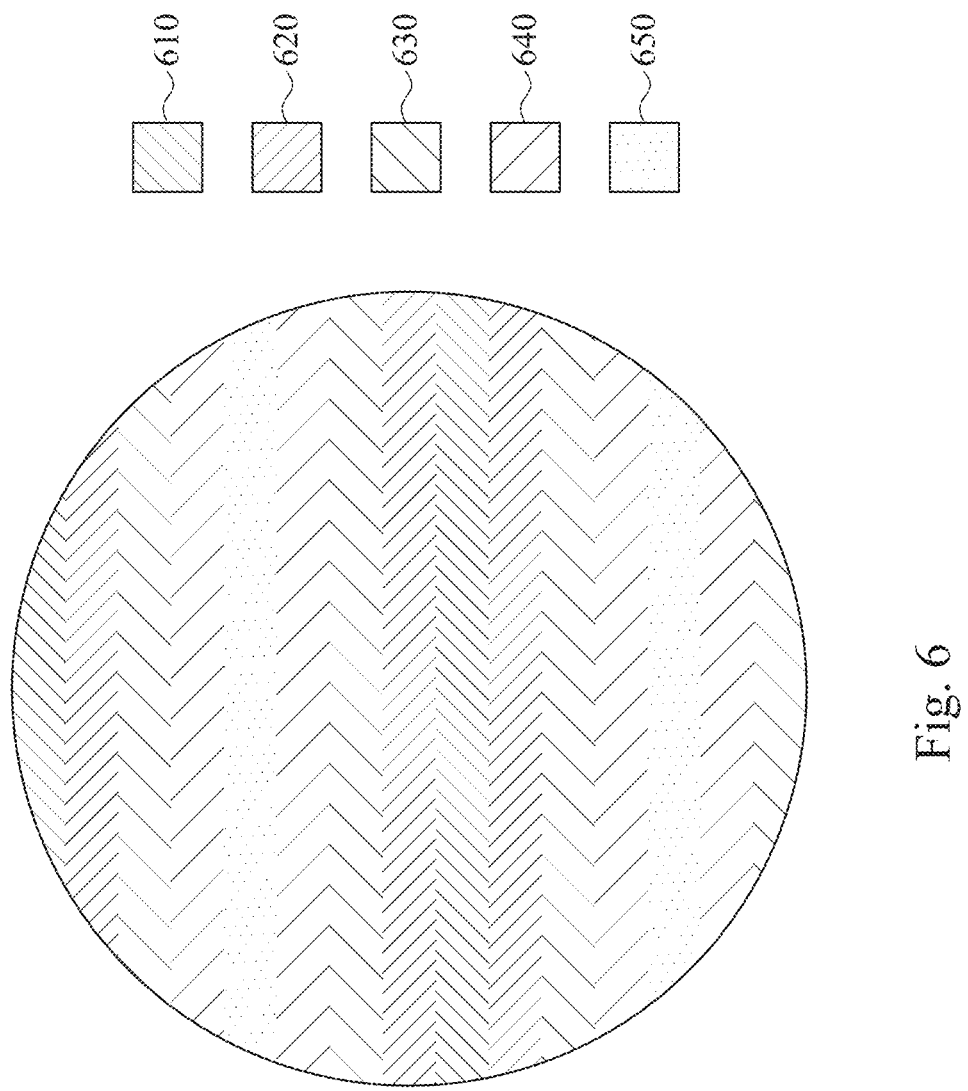
FIG. 6 is a schematic diagram illustrating of a distribution of projection beam polarization directions in accordance with some embodiments of the disclosure.

When the incident light enters different positions of the birefringent depolarizer 330, since the medium thicknesses of the birefringent depolarizer 330 for the light passage are various, the emitted light of different positions will have different optical path differences, and generate polarizations with different directions. As shown in FIG. 6, a cross-section of light emitted through the birefringent depolarizer 330 is represented by a circle, and the different screen-tone patterns represent polarization directions 610-650 including different polarization patterns at different positions of the cross-section of light. In other words, when the area of the incident light emitted on the birefringent depolarizer 330 is larger, or the difference between the thickness of the narrow upper and the thickness of the wide bottom of the birefringent depolarizer 330 is larger, i.e. the more cyclic variation the optical path difference has, the higher the uniformity of the polarization directions of the emitted light is.

Specifically, as shown in FIG. 5B, the laser beam LB enters into the first transmitted plane A of the birefringent depolarizer 330, and emits from the second transmitted plane B of the birefringent depolarizer 330. The first transmitted plane A of the birefringent depolarizer 330 is parallel to XY plane, the crystal axis C-axis of the birefringent depolarizer 330 is parallel to the Y-axis, the incident laser beam LB is parallel to Z axis and vertically enters into the first transmitted plane A, and the included angle between the second transmitted plane B and the XY plane may be about 2 degree. It should be noted that the crystal axis C-axis can be in other direction in other embodiments.

In some embodiments, the birefringent depolarizer 330 may be fixed. In some other embodiments, the birefringent depolarizer 330 may be configured to rotate on XY plane. In yet some other embodiments, the birefringent depolarizer 330 may be configured to move back and forth along X axis, Y axis or Z axis.

It should be noticed that the structure, size, angle and other parameters are merely by example in some possible embodiments for the convenience of discussion, and not intended to limit the present disclosure. Those skilled in the art may design different geometry structure (e.g., thickness, angle, shape, area, etc.) according to the actual needs of the birefringent depolarizer 330.

Please refer to FIG. 6. As described above, when the polarization direction of the laser beam LB maintains a specific angle with the crystal axis C-axis of the birefringent depolarizer 330 at the time of injection, the laser beam LB forms a projection beam PB including multiple polarization patterns after penetrating the birefringent depolarizer 330. In addition, the multiple polarization directions 610-650 of the projection beam PB represented by the different screen-tone patterns on the imaging plane are gradually changing and evenly distributed.

Specifically, as shown in FIG. 6, the diameter of the projection beam PB is about 20 mm, and the projection beam is separated into five polarization directions 610-650, in which the polarization directions of the adjacent two are gradually changing. For example, the polarization direction 610 is a linear polarization along Y axis, the polarization direction 630 is a circular polarization, the polarization direction 650 is a linear polarization along X axis, the polarization direction 620 is an elliptical polarization between the polarization direction 610 and the polarization direction 630, and the polarization direction 640 is an elliptical polarization between the polarization direction 630 and the polarization direction 650.

It should be noted that polarization patterns of five polarization directions illustrated in FIG. 6, but the size, width and the polarization direction are merely examples, and not intended to limit the present disclosure.

In other word, with different projection systems, the suitable angle may be obtained by testing according to the polarization states of the actual incident light and the crystal axis C-axis of the birefringent depolarizer 330, so that the polarization patterns of each position on the screen are evenly distributed.

Figure 7:
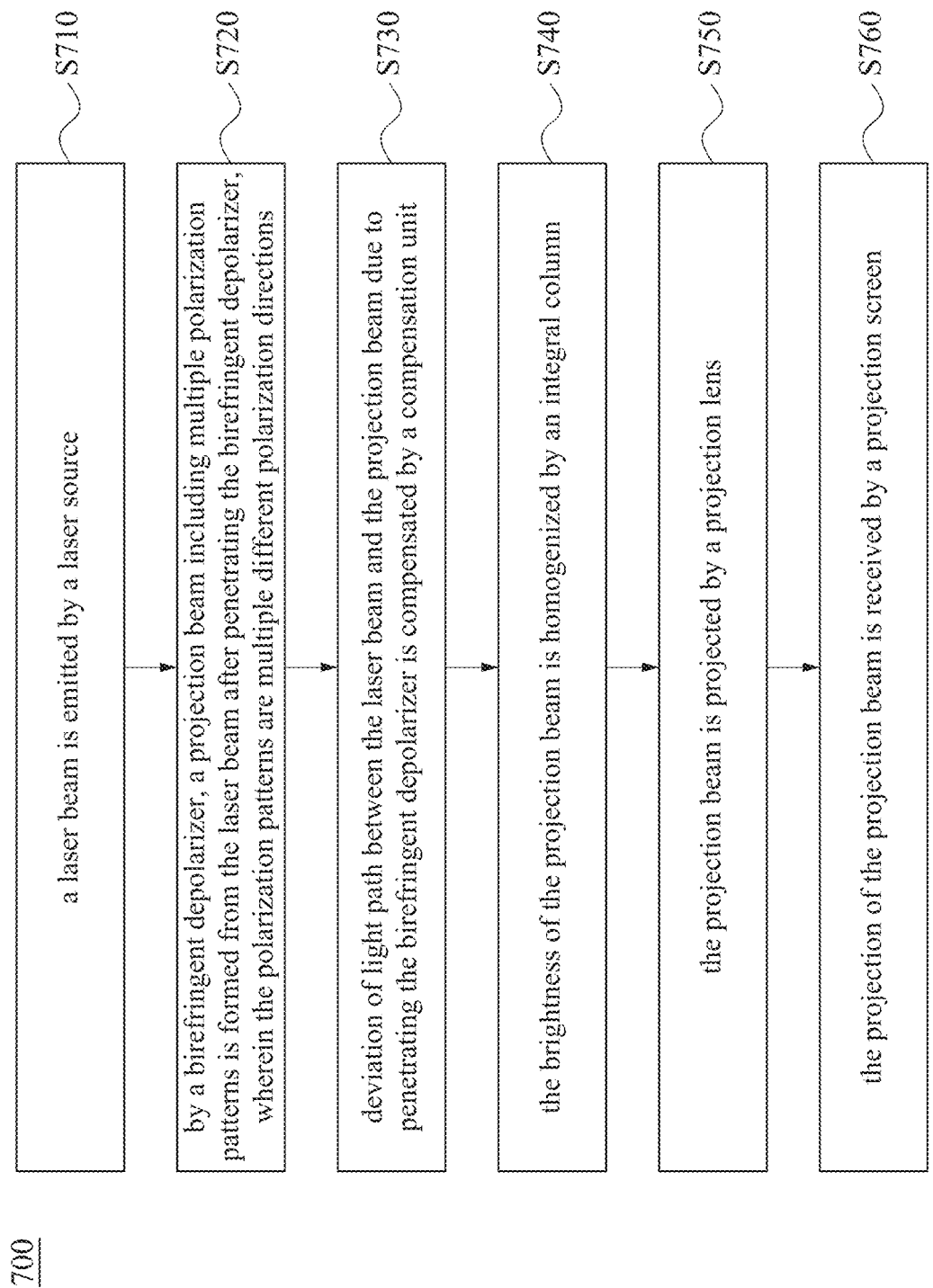
FIG. 7 is a flowchart of a projection method illustrated in accordance with some embodiments of the disclosure.

Please refer to FIG. 7. FIG. 7 is a flowchart of a projection method illustrated in accordance with some embodiments of the disclosure. As shown in FIG. 7, the projection method 700 includes operations S710-S760.

Firstly, in the operation S710, a laser beam LB is emitted by a laser source 310.

Next, in the operation S720, by a birefringent depolarizer 330, a projection beam PB including multiple polarization patterns is formed from the laser beam after penetrating the birefringent depolarizer 330, wherein the polarization patterns are multiple different polarization directions.

Next, in the operation S730, deviation of light path between the laser beam LB and the projection beam PB due to penetrating the birefringent depolarizer 330 is compensated by a compensation unit 340.

Next, in the operation S740, the brightness of the projection beam PB is homogenized by an integration rod 360.

Next, in the operation S750, the projection beam PB is projected by a projection lens 370.

Next, in the operation S760, the projection of the projection beam PB is received by a projection screen 380.

The above projection method 700 is described in accompanying with the embodiments shown in FIGS. 3-6, but not limited thereto. Various alterations and modifications may be performed on the disclosure by those of ordinary skilled in the art without departing from the principle and spirit of the disclosure.

In the foregoing, exemplary operations are included. However, these operations do not need to be performed sequentially. The operations mentioned in the embodiment may be adjusted according to actual needs unless the order is specifically stated, and may even be performed simultaneously or partially simultaneously.

In summary, in various embodiments of the present disclosure, the incident laser beam LB forms the projection beam PB including multiple polarization patterns after penetrating the birefringent depolarizer 330, and the polarization patterns are multiple different polarization directions 610-650, and the polarization directions 610-650 are gradually changing and evenly distributed, so that there will be no difference of color or brightness of projection image formed by the projection beam PB projected at the different positions of the projection screen 380.

Although specific embodiments of the disclosure have been disclosed with reference to the above embodiments, these embodiments are not intended to limit the disclosure. Various alterations and modifications may be performed on the disclosure by those of ordinary skills in the art without departing from the principle and spirit of the disclosure. Thus, the protective scope of the disclosure shall be defined by the appended claims.

What is claimed is:

1. A projection device, comprising:
   a birefringent depolarizer being a single wedge shape and arranged in front of a projection lens;
   a laser source configured to emit a laser beam to penetrate the birefringent depolarizer to be a projection beam having a plurality of polarization patterns different from polarization patterns of the laser beam; and
   a compensation unit arranged after the birefringent depolarizer and configured to compensate for deviation of light path between the laser beam and the projection beam resulting from penetrating the birefringent depolarizer, wherein the projection beam is projected onto a projection screen through the projection lens, and the polarization patterns are a plurality of different polarization directions, and wherein the laser beam enters the birefringent depolarizer with a specific angle to a crystal axis of the birefringent depolarizer to have the polarization patterns of the projection beam evenly distributed.

2. The projection device of claim 1, wherein the projection screen is made of an anisotropic material.

3. A projection system, comprising:
a birefringent depolarizer being a single wedge shape;
a laser source configured to emit a laser beam to penetrate the birefringent depolarizer to be a projection beam having a plurality of polarization patterns different from polarization patterns of the laser beam;
a compensation unit arranged after the birefringent depolarizer and configured to compensate for deviation of light path between the laser beam and the projection beam resulting from penetrating the birefringent depolarizer; and
a projection lens arranged after the compensation unit and configured to output the projection beam,
wherein the laser beam enters the birefringent depolarizer with a specific angle to a crystal axis of the birefringent depolarizer to have the polarization patterns of the projection beam evenly distributed.

4. The projection system of claim 3, wherein the laser source comprises a plurality of sub light sources, and the laser beam comprises a plurality of sub light beams generated by the corresponding sub light sources respectively.

5. The projection system of claim 3, further comprising:
an integration rod arranged after or before the birefringent depolarizer and configured to uniform the brightness of the projection beam.

6. The projection system of claim 3, further comprising:
a projection screen arranged after the projection lens and configured to reflect or refract the projection beam to form a projection image.

7. The projection system of claim 6, wherein the projection screen is made of an anisotropic material.

8. A projection method, comprising:
emitting a laser beam by a laser source;
forming a projection beam with a plurality of polarization patterns from the laser beam by penetrating a birefringent depolarizer, wherein the polarization patterns are a plurality of different polarization directions;
compensating for deviation of light path between the laser beam and the projection beam resulting from penetrating the birefringent depolarizer; and
projecting the projection beam by a projection lens,
wherein the birefringent depolarizer is a single wedge shape and is arranged in front of the projection lens, and
wherein the laser beam maintains a specific incidence angle to a crystal axis of the birefringent depolarizer to have the polarization patterns of the projection beam evenly distributed.

9. The projection method of claim 8, further comprising:
receiving the projection of the projection beam by a projection screen.

* * * * *